Oct. 8, 1963   C. F. BLOODGOOD, JR   3,106,349
LAMP FIXTURE
Filed April 11, 1961

INVENTOR
CLAUDE F. BLOODGOOD, JR.
BY
ATTORNEY

3,106,349
LAMP FIXTURE
Claude F. Bloodgood, Jr., 9541—20th Bay St., Apt. 1, Norfolk, Va.
Filed Apr. 11, 1961, Ser. No. 102,206
2 Claims. (Cl. 240—8.3)

The present invention relates to a light fixture which includes a housing substantially encasing an electric lamp bulb providing a light emitting device which will not entrap water or moisture within the housing and the invention more specifically pertains to a tail lamp for vehicles used in the presence of bodies of water.

It is required under the laws of some States that a trailer for boats be equipped with a lamp fixture which directs red light to the rear and that the tail light fixture be attached to a part of the trailer. When such a lamp fixture is mounted on the trailer frame the rear portion of the trailer and lamp fixture is brought into the presence of the water and in some cases the lamp housing is immersed during a boat launching operation and when the boat is loaded onto the trailer from a position on a body of water. The prior type of tail lamp fixtures admit moisture to the interior of the housing. The water does not readily drain from such a lamp fixture and the moisture together with the absence of good ventilation contribute to corrosion and deterioration of such tail lamp fixtures.

It is an object of the present invention to provide a tail lamp fixture equipped with a lens arranged in sealed relationship with a housing enclosing the lamp bulb and to provide an open and unobstructed lower end for the housing so that when the lamp fixture is immersed in water air will be trapped within the housing preventing the liquid from rising into the presence of the electrical elements.

Another object of the invention is to provide a tail lamp assembly wherein the housing above and open lower end thereof is impervious and serves to trap air within the housing preventing the level of the water which freely enters through the lower open end from rising above a predetermined level within the housing and to provide a wall structure at the lower portion of the housing which facilitates drainage of liquid and moisture through the open lower end when the lamp fixture is removed from the water.

Other objects and features of the invention will be appreciated by those skilled in the art to which the invention pertains as the present disclosure proceeds and upon consideration of the following detailed description taken with the accompanying drawing wherein an exemplary embodiment of the invention is disclosed.

Figure 1:
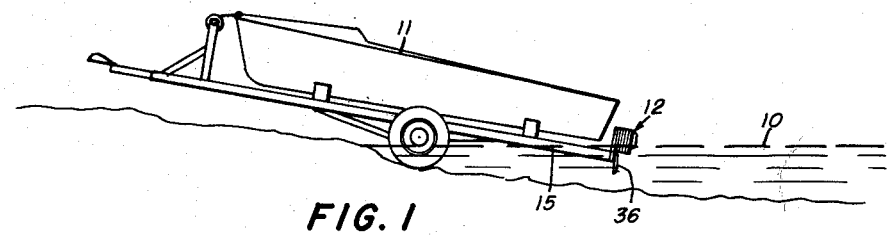
FIG. 1 is a diagrammatic side elevational view of a boat trailer showing a tail lamp fixture exhibiting the invention on the rear portion of the trailer.

A lamp fixture embodying the invention is adapted for use in the presence of water and is particularly suitable to function as a tail lamp for a trailer represented in FIG. 1 for hauling boats. Such a trailer is adapted to be hitched to the rear of an automotive vehicle and is adapted to be maneuvered to a position on an inclined shore of a body of water 10 to facilitate launching and loading of the boat 11. A tail lamp fixture exhibiting the invention is shown generally at 12 mounted on the trailer frame 15 and during a boat launching operation and when the trailer is in position for the boat to be loaded thereon from the water the tail lamp is often partly or completely immersed in the water 10.

The lamp fixture 12 is formed of a sheet material desirably of a type which does not corrode in the presence of water. The housing may be formed of plastic or a metal which is not attacked, even by sea water. In the embodiment illustrated the housing is formed of plastic material molded to form a hood shaped housing. The housing is provided with a straight wall 14 and another straight wall 16 spaced from and substantially parallel to the wall 14. A side wall 17 joins the walls 14 and 16 and is of arcuate shape through an upper area 18 and extends downwardly to provide another side wall 19. All of the walls throughout the lower portion of the housing have vertically disposed inner surfaces.

One or more bolts 21 may be mounted on the wall 14 for attaching the lamp fixture to the trailer frame 15 so that it remains in a generally upright position. The head 22 of each bolt 21 and the stem thereof is sealed with respect to the housing wall 14 by suitable means such as the gasket type washers 23.

A lens 24 of a suitable type is mounted within an opening 26 formed in the wall 16. The lens may project beyond the outer face of the wall 16 as shown or it may be flush with the wall 16 or be of a convex type. The lens 24 is desirably of the type that light rays passing therethrough appear red so that the fixture serves as a tail lamp for a land vehicle. The perimeter of the lens 24 is sealed with respect to the wall 16.

A bracket 28 is provided in the upper part of the hood and it may be carried by the wall 14 to project toward the wall 16. The bracket 28 provides means for supporting a lamp bulb socket 29 in which a bulb 31 is detachably mounted in a conventional manner. The conductors 32 extending from the socket 29 may extend through the open lower end of the housing for connection to a source for energizing the bulb 31.

Figure 2:
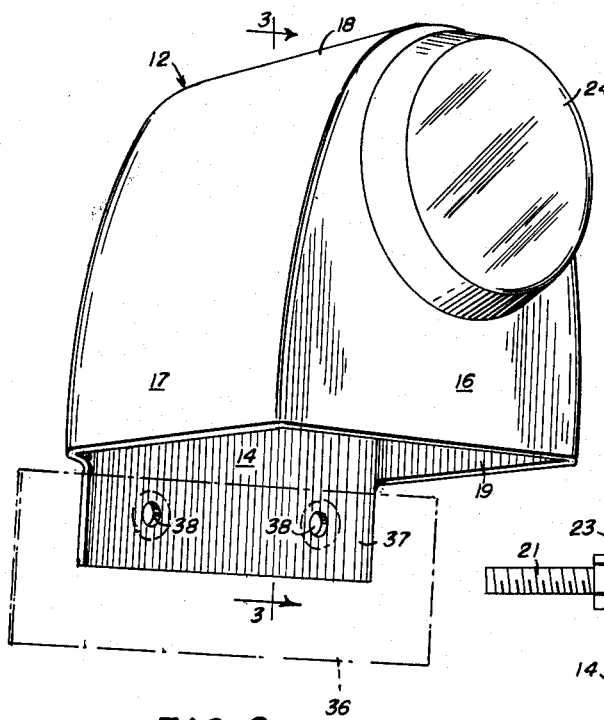
FIG. 2 is a perspective view of the lamp fixture.
Figure 3:
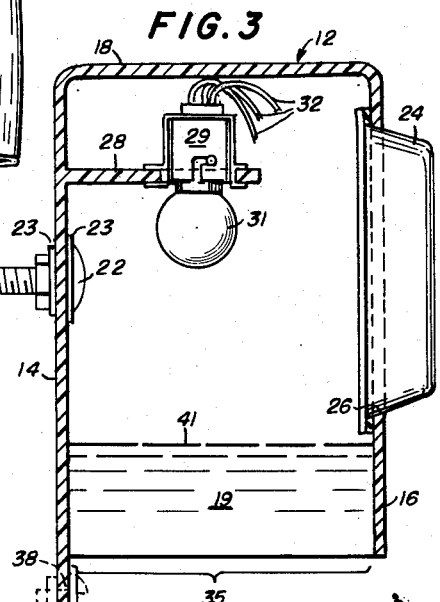
FIG. 3 is a sectional view taken on the line 3—3 of FIG. 2.

A feature of the invention pertains to an unobstructed open lower end of the housing. It will be appreciated from a consideration of FIGS. 2 and 3 that the area between the inner faces of the four walls is devoid of closure means or surfaces which project laterally inwardly from the respective walls. This provides an open area through which light rays from the bulb 31 may project downwardly onto a license plate indicated in phantom lines at 36 in FIG. 2. The wall 14 may be provided with a downwardly extending projection 37 having openings 38 therein for attaching the license plate to the lamp housing.

In use and when the rear end portion of the trailer frame 15 is in position somewhat like that represented in FIG. 1 the tail lamp fixture 12 will be in the presence of the water and portions of the walls may be below the level of the water 10. As the lamp fixture moves downwardly into the water air within the hood shaped housing is trapped therein because the structure above the open lower end 35 is impervious to the escape of air. As the water level rises in relation to the lamp fixture the water within the lower end of the lamp housing compresses the air thereabove and prevents the water from rising above a predetermined level within the lower end portion of the housing. Thus even though the lamp housing 12 is completely immersed the water level within the lamp housing will not ordinarily rise above the level indicated at 41 in FIG. 2. The water level within the lamp housing accordingly does not rise into the presence of the lamp bulb 31 and its socket 29.

When the boat trailer is rolled from the position shown in FIG. 1 so that the rear end of the trailer and the lamp housing are above the level of the water any liquid within the lamp housing drains readily and freely through the unobstructed lower end 35. The open lower end permits air to circulate freely within the housing to vaporize any moisture on the walls of the lamp fixture.

While the invention has been described with reference to specific structural details and with regard to a lamp housing of a particular shape it will be appreciated that changes may be made in the structural characteristics as well as the overall assembly. Such changes and other further modifications may be made without departing from the spirit and scope of the invention.

What I claim and desire to secure by Letters Patent is:

1. A lamp structure for a boat hauling trailer consisting of, an impervious hood shaped housing having spaced walls, means carried by one wall in sealed relationship therewith for attaching the housing to the trailer for maintaining the housing with said walls in generally upright positions, a rear wall of the housing having an opening therein in the upper portion thereof, a lens filling said opening with the perimeter thereof sealed with respect to said rear wall, a lamp bulb socket within an upper portion of said housing, means carried by the housing supporting said lamp bulb socket in operative relationship to said lens, lower portions of said walls having substantially vertical inner surfaces and providing an open lower end for the housing, said housing and said lens being impervious above said open lower end through which water may enter when the housing is immersed in water whereby air trapped within the housing develops pressure restricting the water to the lower portion of the housing, and said inner surfaces of the walls facilitating drainage of water from the housing.

2. A lamp structure for a boat hauling trailer consisting of, an impervious hood shaped housing having spaced walls, means carried by one wall in sealed relationship therewith for attaching the housing to the trailer for maintaining the housing with said walls in generally upright positions, a lens carried by a rear wall in sealed relation with respect thereto, a lamp bulb socket within an upper portion of said housing, means carried by the housing supporting said lamp bulb socket in operative relationship to said lens, said housing having an open lower end throughout the area between said walls, lower portions of said walls having substantially straight upright inner surfaces continuing to said open lower end, and said housing and lens being impervious above said open lower end through which water in a limited quantity may enter when the housing is immersed in water.

References Cited in the file of this patent

UNITED STATES PATENTS

| | | |
|---|---|---|
| 1,129,695 | Lindsey | Feb. 23, 1915 |
| 1,356,494 | Overtree | Oct. 19, 1920 |
| 2,391,475 | Newhardt | Dec. 25, 1945 |
| 2,702,862 | Finney | Feb. 22, 1955 |
| 2,866,082 | Clayton et al. | Dec. 23, 1958 |
| 2,887,563 | Keikhaefer | May 19, 1959 |
| 2,925,487 | Beach | Feb. 16, 1960 |